United States Patent
Larsson et al.

(10) Patent No.: US 8,934,403 B2
(45) Date of Patent: Jan. 13, 2015

(54) METHOD AND ARRANGEMENT FOR UPLINK POWER CONTROL

(75) Inventors: Daniel Larsson, Solna (SE); Rainer Bachl, Nuremberg (DE); Dirk Gerstenberger, Stockholm (SE); Tobias Tynderfeldt, Solna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 69 days.

(21) Appl. No.: 13/394,932

(22) PCT Filed: Jan. 27, 2012

(86) PCT No.: PCT/SE2012/050082
§ 371 (c)(1),
(2), (4) Date: Mar. 8, 2012

(87) PCT Pub. No.: WO2013/022396
PCT Pub. Date: Feb. 14, 2013

(65) Prior Publication Data
US 2013/0039286 A1      Feb. 14, 2013

Related U.S. Application Data

(60) Provisional application No. 61/521,514, filed on Aug. 9, 2011.

(51) Int. Cl.
*H04B 7/185*      (2006.01)
*H04W 52/22*      (2009.01)
(Continued)

(52) U.S. Cl.
CPC .......... *H04W 52/221* (2013.01); *H04W 52/146* (2013.01); *H04W 52/367* (2013.01)
USPC ........... 370/318; 370/252; 370/329; 370/431; 455/13.4; 455/127.1; 455/450; 455/464; 455/509; 455/552

(58) Field of Classification Search
CPC ............ H04W 52/146; H04W 52/367; H04W 52/221
USPC ................. 370/252, 318, 329, 431; 455/13.4, 455/127.1, 450, 464, 509, 552
See application file for complete search history.

(56) References Cited

U.S. PATENT DOCUMENTS

2010/0273515 A1* 10/2010 Fabien et al. ................. 455/509
2011/0159911 A1   6/2011 Chen et al.
(Continued)

FOREIGN PATENT DOCUMENTS

WO           0152440 A2     7/2001
WO     WO 2009129698 A1 * 10/2009

OTHER PUBLICATIONS

3GPP TS 36.213 V10.2.0, Jun. 2011. (From the Applicant's IDS filed on Aug. 1, 2012.).*

(Continued)

*Primary Examiner* — Mark Rinehart
*Assistant Examiner* — Mang Yeung
(74) *Attorney, Agent, or Firm* — Patent Portfolio Builders PLLC

(57) ABSTRACT

The disclosure relates to methods and devices for performing uplink power control in a radio communication system. An example method comprises a step of receiving, at a user equipment (UE) a transmit power control (TPC) command. The method also comprises, if the UE does not have an uplink transmission scheduled for a subframe associated with the TPC command, a step of accumulating, by the UE, the TPC command with previously received TPC commands based on whether the UE has reached a maximum transmit power or a minimum transmit power in a reference format for a Physical Uplink Shared Channel (PUSCH), Sounding Reference Signal (SRS) or Physical Uplink Control Channel (PUCCH) transmission. Thus the UE is enabled to receive TPC commands while the UE is not transmitting anything in the uplink.

20 Claims, 10 Drawing Sheets

(51) Int. Cl.
*H04W 52/14* (2009.01)
*H04W 52/36* (2009.01)

(56) References Cited

U.S. PATENT DOCUMENTS

2011/0267994 A1* 11/2011 Pan et al. .................. 370/280
2012/0087306 A1* 4/2012 Kim et al. .................. 370/328

OTHER PUBLICATIONS

3GPP; "3rd Generation Partnership Project; Technical Specification Group Radio Access Network; Evolved Universal Terrestrial Radio Access (E-UTRA); Physical layer procedures (Release 10)"; XP050537179; DRAFT3GPP TS 36.213 Va.2.0. (Jun. 2011); pp. 1-120; Valbonne, France.

Ericsson, et al.; "Draft LS on the reference format on virtual PHR"; 3GPP TSG-RAN WG1 #62bis; R1-105814; XP050463456; Oct. 11-15, 2010; p. 1; Xi'an, China.

Ericsson, et al.; "Pcmax,c reporting'" 3GPP TSG-RAN WG2 #72bis; Tdoc R2-110109; XP050474042; Jan. 17-21, 2011; p. 1; Dublin, Ireland.

International Search Report in corresponding International Application No. PCT/SE2012/050082 mailed May 30, 2012.

Written Opinion of the International Searching Authority in corresponding International Application No. PCT/SE2012/050082 mailed May 30, 2012.

3GPP; "3rd Generation Partnership Project; Technical Specification Group Radio Access Network; Evolved Universal Terrestrial Radio Access (E-UTRA); User Equipment (UE) radio transmission and reception (Release 10)"; 3GPP TS 36.101 V10.3.0 (Jun. 2011); pp. 1-237; Valbonne, France.

* cited by examiner

One OFDM symbol including cyclic prefix

METHOD AND ARRANGEMENT FOR UPLINK POWER CONTROL

TECHNICAL FIELD

The embodiments described herein relate generally to telecommunications systems and in particular to uplink power control in a radio communication system.

BACKGROUND

Radio communication networks were originally developed primarily to provide voice services over circuit-switched networks. The introduction of packet-switched bearers in, for example, the so-called 2.5G and 3G networks enabled network operators to provide data services as well as voice services. Eventually, network architectures will likely evolve toward all Internet Protocol (IP) networks which provide both voice and data services. However, network operators have a substantial investment in existing infrastructures and would, therefore, typically prefer to migrate gradually to all IP network architectures in order to allow them to extract sufficient value from their investment in existing infrastructures. Also to provide the capabilities needed to support next generation radio communication applications, while at the same time using legacy infrastructure, network operators could deploy hybrid networks wherein a next generation radio communication system is overlaid onto an existing circuit-switched or packet-switched network as a first step in the transition to an all IP-based network. Alternatively, a radio communication system can evolve from one generation to the next while still providing backward compatibility for legacy equipment.

One example of such an evolved network is based upon the Universal Mobile Telephone System (UMTS) which is an existing third generation (3G) radio communication system that is evolving into High Speed Packet Access (HSPA) technology. Yet another alternative is the introduction of a new air interface technology within the UMTS framework, e.g., the so-called Long Term Evolution (LTE) technology. Target performance goals for LTE systems include, for example, support for 200 active calls per 5 MHz cell and sub 5 ms latency for small IP packets. Each new generation, or partial generation, of mobile communication systems add complexity and abilities to mobile communication systems and this can be expected to continue with either enhancements to proposed systems or completely new systems in the future. The 3rd Generation Partnership Project (3GPP) is a standards-developing organization that is continuing its work of evolving HSPA and LTE, and creating new standards that allow for even higher data rates and improved functionality.

In a radio access network implementing LTE, a user equipment (UE), alternatively also referred to herein as a mobile terminal or a user terminal, is wirelessly connected to a base station. The term "base station" is used herein as a generic term. In the LTE architecture an evolved NodeB (eNodeB or eNB) may correspond to the base station, i.e., a base station is a possible implementation of the eNodeB. However, the term "eNodeB" is also broader in some senses than the conventional base station since the eNodeB refers, in general, to a logical node. The term "base station" is used herein as inclusive of a base station, a NodeB, an eNodeB or other nodes specific for other architectures. An eNodeB in an LTE system handles transmission and reception in one or several cells. In LTE several different types of physical downlink (DL) channels and physical uplink (UL) channels have been specified. Physical Uplink Shared Channel (PUSCH) is a physical uplink channel that is used by the UE for data transmission after the UE has been assigned an uplink resource for data transmission on the PUSCH. The PUSCH also carries control information. Physical Uplink Control Channel (PUCCH) is a physical uplink channel which carries control information in the form of downlink acknowledgements and Channel Quality Indicator (CQI) related reports.

Uplink power control is used both on the PUSCH and on PUCCH. The idea behind uplink power control is to ensure that the mobile terminal transmits with sufficient power, but at the same time not be too high, since that would only increase the interference to other users in the network. In both cases, a parameterized open loop combined with a closed loop mechanism is used. Roughly, the open loop part is used to set a point of operation, around which the closed loop component operates. Different parameters, targets and 'partial compensation factors', for user and control plane are used.

In more detail, for PUSCH the mobile terminal sets the output power according to $$P_{PUSCH,c}(i) = \min \begin{Bmatrix} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{Bmatrix}$$

[dBm], where $P_{CMAX,c}$ is the maximum transmit power for the mobile terminal for the serving cell c, $M_{PUSCH,c}$ is the number of resource blocks assigned for the serving cell c, $P_{O\_PUSCH,c}$ and $\alpha_c$ control the target received power for the serving cell c, $PL_c$ is the estimated pathloss for the serving cell c, $\Delta_{TF,c}$ is transport format compensator for the serving cell c and $f_c$ is a UE specific offset or 'closed loop correction' for the serving cell c. The function $f$ may represent either absolute or accumulative offsets depending on the operating mode of the closed loop power control. For a more detailed description of the uplink power control for PUSCH see section 5.1.1.1 of the standards document 3GPP TS. 36.213 v.10.2.0. A similar uplink power control has been specified for the PUCCH in section 5.1.2.1 of the same standards document.

The closed loop power control can be operated in two different modes either an accumulated or an absolute mode. Both modes are based on transmit power control (TPC) commands which are part of the downlink control signaling. When absolute power control is used, the closed loop correction function is reset every time a new TPC command is received. When accumulated power control is used, the TPC command is a delta correction with regard to the previously accumulated closed loop correction.

Of particular interest for this disclosure is a problem related to accumulated power control. The base station can filter the mobile terminal's power in both time and frequency to provide an accurate power control operating point for the mobile terminal. The accumulated power control command is defined as $f_c(i)=f_c(i-1)+\delta_{PUSCH,c}(i-K_{PUSCH})$, where $\delta_{PUSCH,c}$ is the TPC command received in $K_{PUSCH}$ subframe before the current subframe i and $f_c(i-1)$ is the accumulated power control value. If the UE has reached $P_{CMAX,c}$ for serving cell c, positive TPC commands, i.e. commands indicating a raise in transmit power, for serving cell c shall not be accumulated. If the UE has reached a defined minimum power, negative TPC commands, i.e. commands indicating a decrease in transmit power, shall not be accumulated.

There are different occasions when the accumulated power control value is reset, such as
   at cell-change,
   when entering/leaving Radio Resource Control (RRC) active state,
   when an absolute TPC command is received,
   when $P_{O\_UE\_PUCCH}$ is received, which implies reconfiguration by a higher layer, and
   when the mobile terminal (re)synchronizes.

In the case of reset, the accumulated power control value is reset to $f(0)=\Delta P_{rampup}+\delta_{msg2}$, where $\delta_{msg2}$ is the TPC command indicated in random access response and $\Delta P_{rampup}$ corresponds to the total power ramp-up from a first to a last preamble.

The PUCCH power control has in principle the same configurable parameters as described above for PUSCH, with the exception that PUCCH only has full pathloss compensation, i.e. does only cover the case of $\alpha=1$.

The power control for Sounding Reference Signal (SRS) follows the power control for PUSCH with the addition of some SRS specific offsets.

There are two different ways for the UE to receive TPC commands on the PUSCH. The UE always receives a TPC command when it receives a Downlink Control Information (DCI) format for an UL PUSCH transmission. In Rel-10 of the 3GPP LTE standard, this corresponds to DCI format 0/4. The UE can also receive TPC commands by DCI format 3/3A. DCI format 3/3A are DCI messages that are dedicated to be used for TPC commands. The UE is assigned a specific radio network temporary identity (RNTI) that the UE uses to identify whether the received DCI format 3/3A is actually sent to it. Further it is possible to assign the UE with one RNTI for PUCCH and one for PUSCH TPC commands. DCI format 3/3A contains a long bit vector. Several UEs receive the same DCI format 3/3A message, this by assigning them with the same RNTI. Each UE identifies its TPC command within the received DCI format 3/3A with a code point that it is assigned to. The TPC command consists of 1 bit if DCI format 3A is received and 2 bits if DCI format 3 is received for each UE.

However, there are some problems associated with determining when to accumulate TPC commands in radio communication systems, such as those systems described above. These need to be overcome and are described in more detail below.

SUMMARY

An object of the present invention is to provide improved methods and devices for uplink power control in a radio communication system.

The above stated object is achieved by means of a method and user equipment according to the independent claims.

A first embodiment provides a method for performing uplink power control in a radio communication system. The method comprises a step of receiving, at a UE, a TPC command. According to the method, if the UE does not have an uplink transmission scheduled for a subframe associated with the TPC command, the UE accumulates the TPC command with previously received TPC commands based on whether the UE has reached a maximum transmit power or a minimum transmit power in a reference format for a PUSCH, SRS or PUCCH transmission.

A second embodiment provides a UE configured for use in a radio communication system. The UE comprises a transceiver configured to receive a TPC command and a processor. The processor is configured to, if the UE does not have an uplink transmission scheduled for a subframe associated with the TPC command, accumulate the TPC command with previously received TPC commands based on whether the UE has reached a maximum transmit power or a minimum transmit power in a reference format for a PUSCH, SRS or PUCCH transmission.

An advantage according to some disclosed example embodiments is that a UE is enabled to receive TPC commands while the UE is not transmitting anything in the UL. This gives, for example, the UE more opportunity to receive TPC commands and therefore allows the eNB to communicate with the UE under conditions where the required transmit energy from the UE varies significantly.

A further advantage of some disclosed example embodiments is that by basing the UE's decision of whether or not to accumulate a TPC command on a reference format when the UE is not transmitting, a solution which is flexible from the viewpoint of the eNB is achieved. The eNB is not required to keep track on when the UE is transmitting, but is able to communicate TPC commands to the UE irrespective of when the UE is transmitting. Still the eNB can rely on that the UE will react to the received TPC command in an appropriate way irrespective of when the UE is transmitting.

A further advantage of some disclosed example embodiments is that by basing the UE's decision of whether or not to accumulate a TPC command on a reference format when the UE is not transmitting, a solution which is easy to implement is achieved. The reference format can be stored in some type of static memory, in contrast to some other solutions which require a more complicated implementation a dynamic memory to keep track of dynamic parameters or events.

Further advantages and features of embodiments of this disclosure will become apparent when reading the following detailed description in conjunction with the drawings.

DETAILED DESCRIPTION

The following detailed description of the example embodiments refers to the accompanying drawings. The same reference numbers in different drawings identify the same or similar elements. Also, the following detailed description is provided for the purpose of illustration and explanation of some example embodiments and not for the purpose of limitation. The following embodiments are discussed, for simplicity, with regard to the terminology and structure of LTE systems. However, the embodiments to be discussed next are not limited to LTE systems but may be applied to other telecommunications systems.

Reference throughout the specification to "one embodiment" or "an embodiment" means that a particular feature, structure, or characteristic described in connection with an embodiment is included in at least one embodiment of this disclosure. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

Figure 1:
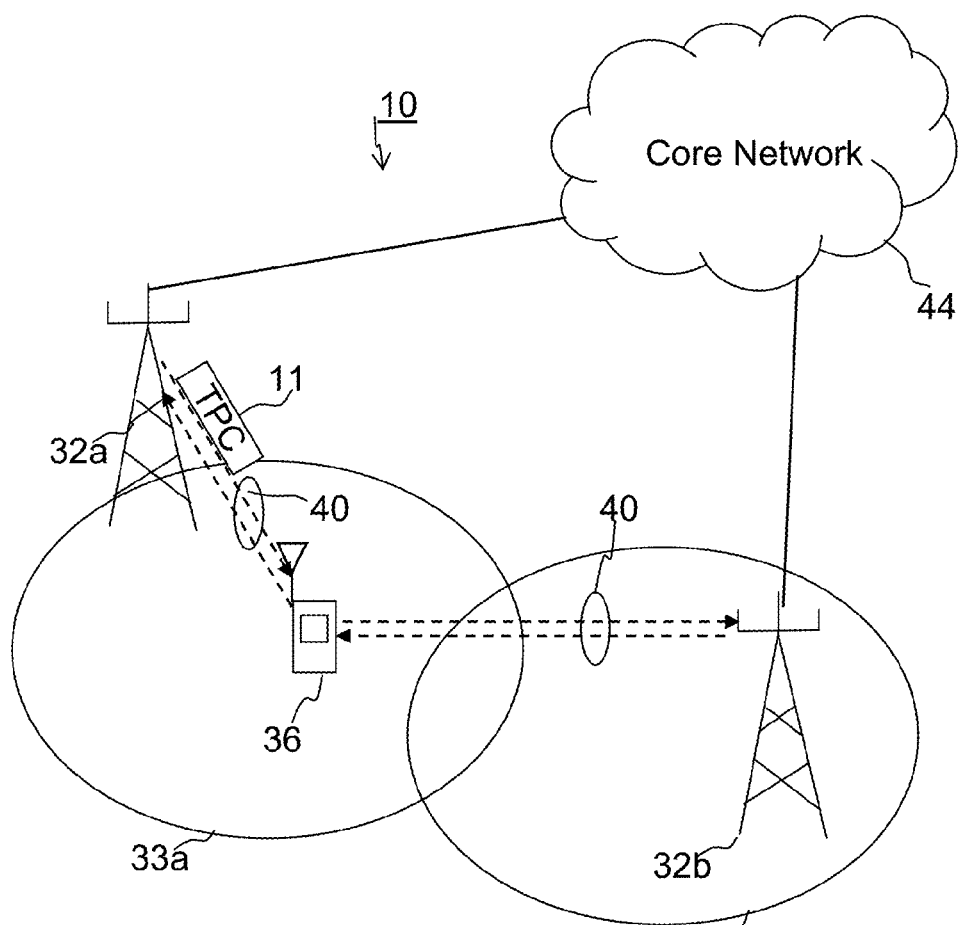
FIG. 1 is a schematic diagram showing a scenario in a radio communication system.

To provide some context for the following example embodiments related to uplink power control, consider the example radio communication system 10 shown in FIG. 1. FIG. 1 shows, among other things, two eNodeBs 32*a* and 32*b* and one UE 36. An eNodeB in an LTE system handles transmission and reception in one or several cells, as shown for example in FIG. 1. In FIG. 1 it is illustrated that the eNodeB 32*a* serves a cell 33*a* and that the eNodeB 32*b* serves a cell 33*b*. The UE 36 uses dedicated channels 40 to communicate with the eNodeB(s) 32*a*, 32*b*, e.g., by transmitting or receiving Radio Link Control (RLC) Protocol Data Unit (PDU) segments which is described further below. As mentioned above in the background section, TPC commands are used for uplink power control. In FIG. 1, a TPC command 11 is schematically illustrated. The TPC command 11 is transmitted as part of the downlink control signaling from the eNodeB 32*a* to the UE 36.

Figure 2:
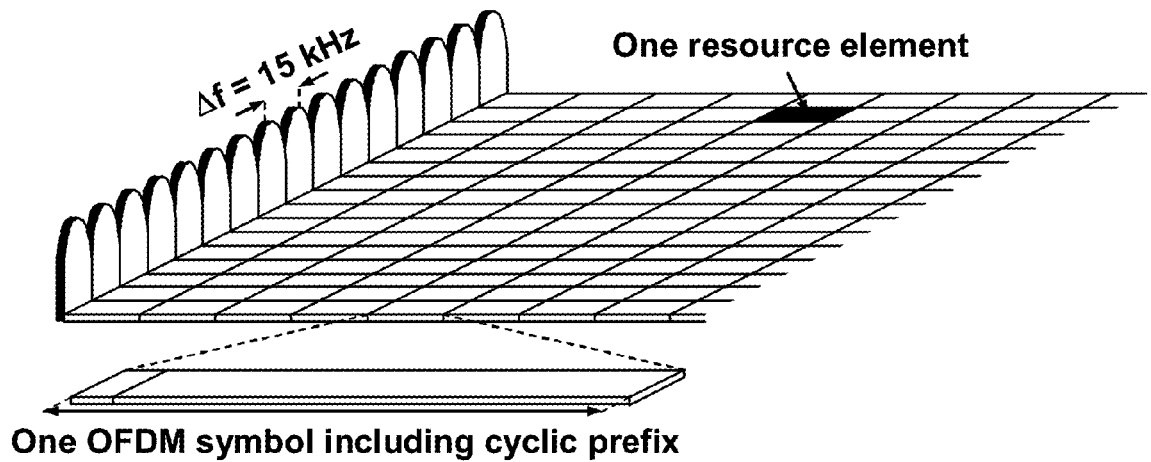
FIG. 2 is a schematic diagram illustrating the LTE time-frequency grid.
Figure 3:
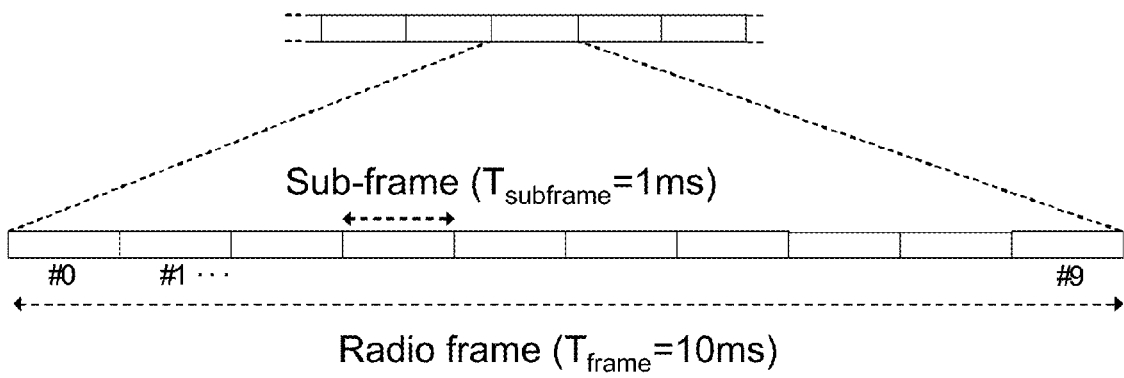
FIG. 3 is a schematic diagram illustrating the LTE frame structure.

LTE uses orthogonal frequency division multiplexing (OFDM) in the downlink and discrete Fourier transform (DFT)-spread OFDM in the uplink. The basic LTE downlink physical resource can thus be seen as a time-frequency grid as illustrated in FIG. 2, where each resource element corresponds to one OFDM subcarrier during one OFDM symbol interval. In the time domain, LTE downlink transmissions are organized into radio frames of 10 ms, each radio frame consisting of ten equally-sized subframes of length $T_{subframe}=1$ ms as shown in FIG. 3.

Figure 4:
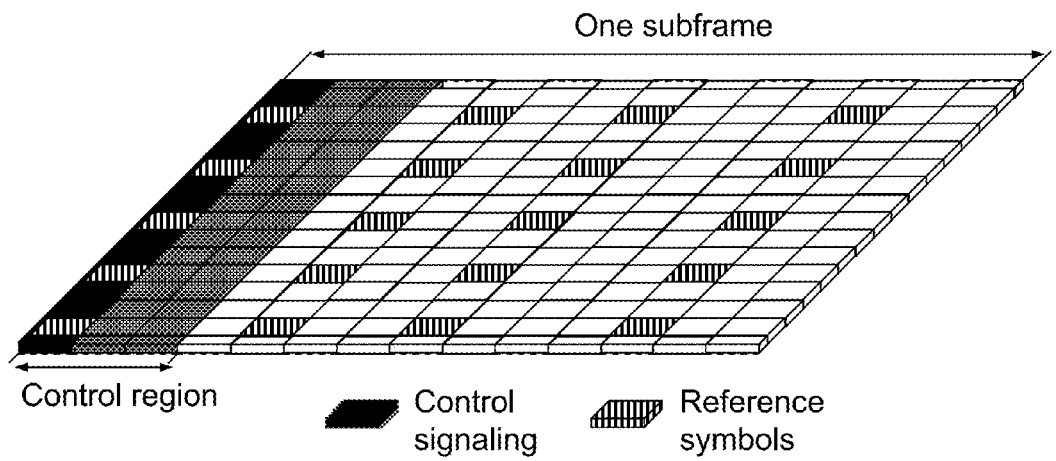
FIG. 4 is a schematic diagram illustrating an LTE subframe.

Furthermore, the resource allocation in LTE is typically described in terms of resource blocks, where a resource block corresponds to one slot (0.5 ms) in the time domain and 12 contiguous subcarriers in the frequency domain. Resource blocks are numbered in the frequency domain, starting with 0 from one end of the system bandwidth. Downlink transmissions are dynamically scheduled, i.e., in each subframe the base station transmits control information indicating to which terminals and on which resource blocks the data is transmitted during the current downlink subframe. This control signaling is typically transmitted in the first 1, 2, 3 or 4 OFDM symbols in each subframe. A downlink system with 3 OFDM symbols as the control region is illustrated in FIG. 4.

LTE uses hybrid-ARQ where, after receiving downlink data in a subframe, the terminal attempts to decode it and reports to the base station whether the decoding was successful (ACK) or not (NACK). In case of an unsuccessful decoding attempt, the base station can retransmit the erroneous data. Uplink control signaling from the terminal to the base station thus consists of: hybrid-ARQ acknowledgements for received downlink data; terminal reports, also known as CQI, related to the downlink channel conditions, used as assistance for the downlink scheduling; and scheduling requests, indicating that a mobile terminal needs uplink resources for uplink data transmissions.

If the mobile terminal has not been assigned an uplink resource for data transmission, the L1/L2 control information (channel-status reports, hybrid-ARO acknowledgments, and scheduling requests) is transmitted in uplink resources (resource blocks) specifically assigned for uplink L1/L2 control information on the PUCCH. More details regarding the PUCCH is provided below.

Figure 9:
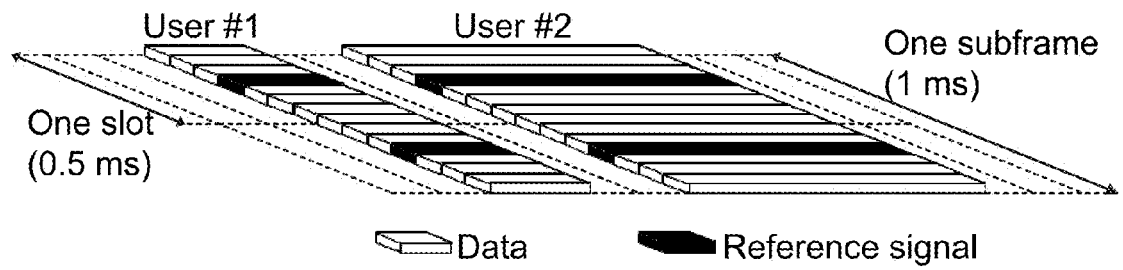
FIG. 9 is a schematic diagram depicting PUSCH resource assignment.

To transmit data in the uplink the mobile terminal has to be assigned an uplink resource for data transmission, on the PUSCH. In contrast to a data assignment in downlink, in uplink the assignment must always be consecutive in frequency, this to retain the signal carrier property of the uplink as illustrated in FIG. 9.

The middle single carrier (SC) symbol in each slot is used to transmit a reference symbol. If the mobile terminal has been assigned an uplink resource for data transmission and at the same time instance has control information to transmit, it will transmit the control information together with the data on PUSCH.

Having described some general LTE features and example LTE devices in which aspects of uplink power control and accumulation of TPC commands according to example embodiments can be implemented, the discussion now returns to consideration of these power control topics. Regarding the accumulation of TPC commands, as mentioned in the background section, it is specified in section 5.1.1.1 and section 5.1.2.1 of 3GPP 36.213 v.10.2.0, "Physical layer procedures" that the UE shall not accumulate positive TPC commands if the UE has reached $P_{CMAX}$, and the UE shall not accumulate negative TPC command if the UE has reached the UE's minimum transmission power. This is possible for the UE to derive or determine if the UE, in the same subframe where the TPC commands are accumulated, transmits a PUSCH or PUCCH transmission. However, the inventors have realized that if the UE does not transmit a PUCCH, SRS or PUSCH transmission it is not possible for the UE to derive or determine either $P_{CMAX,c}$ or the UE's minimum transmission power. Accordingly, it becomes uncertain as to how to deal with the accumulation of TPC commands under these circumstances wherein the UE cannot readily determine the values against which it is supposed to determine whether or not to accumulate received TPC commands.

Exemplary embodiments provide a number of different techniques whereby the UE can determine how to handle received TPC commands under certain conditions, e.g., if the UE does not have any PUSCH, PUCCH or SRS transmissions. Some general examples are described in the following where four different sets of embodiments, along with various sub-embodiments are described. Each of these solutions involves a situation where a UE receives a TPC command without having a corresponding UL transmission.

In a first set of embodiments, the UE determines whether to accumulate a received TPC command by determining whether the UE has reached $P_{CMAX,c}$ or if the UE has derived a transmission power that is below the minimum transmit power in a reference format for either a PUSCH/SRS or PUCCH transmission.

Some non-exhaustive examples of sub-embodiments of this first set of embodiments will now be described.

Figure 11:
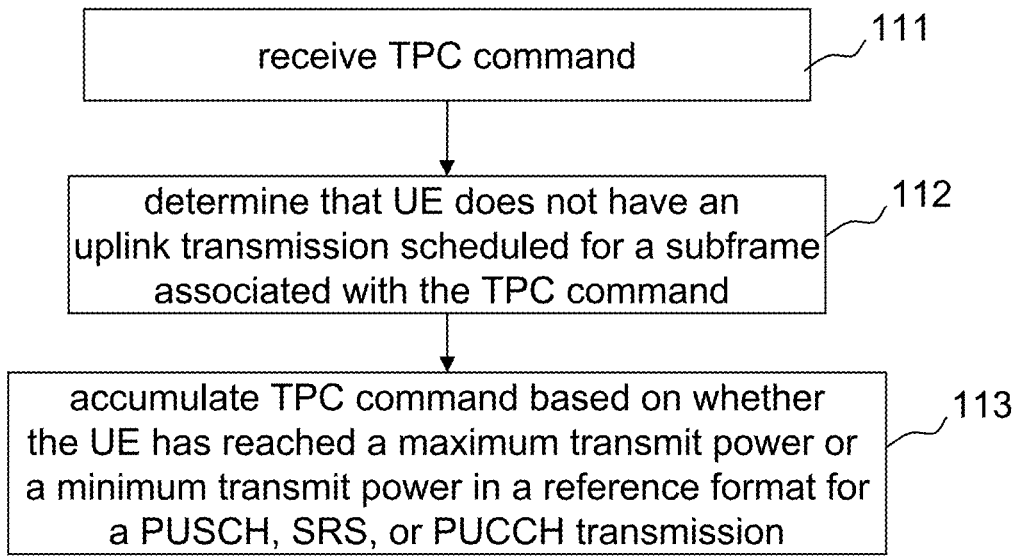
FIG. 11 is a flow diagram illustrating an embodiment of a method for performing uplink power control.

FIG. 11 is a flow diagram illustrating an embodiment of a method for performing uplink power control in a radio communication system, such as the system 10 illustrated in FIG. 1. The method is performed in a UE, such as the UE 36 shown in FIG. 1. In a step 111 the UE receives a TPC command. If the UE does not have an uplink transmission scheduled for a subframe associated with the received TPC command, the UE accumulates the TPC command with previously received TPC commands based on whether the UE has reached a maximum transmit power or a minimum transmit power in a reference format for a PUSCH, SRS or PUCCH transmission in a step 113. In FIG. 11 it is illustrated that a check of whether the UE has an uplink transmission scheduled for the subframe associated with the TPC command is performed in a step 112.

By using the reference format, a reference maximum transmit power and/or a reference minimum transmit power may be determined for the UE and used in the decision of whether or not to accumulate the received TPC command with previously received TPC commands.

Figure 12:
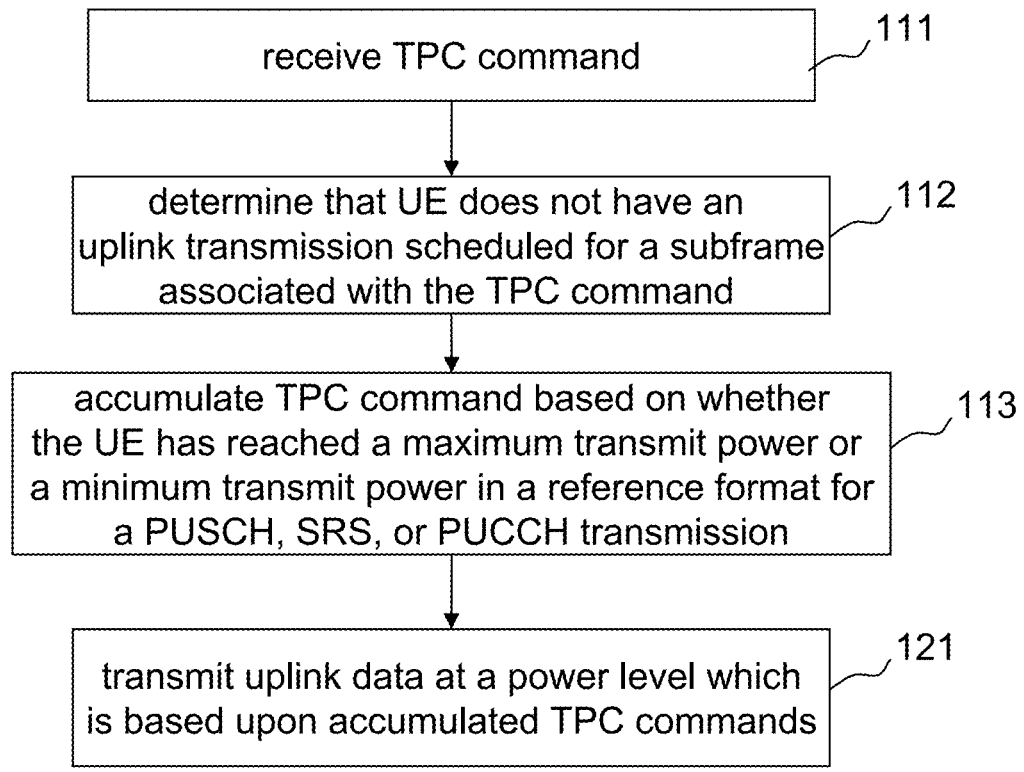
FIG. 12 is a flow diagram illustrating an alternative embodiment of a method for performing uplink power control.

FIG. 12 is a flow diagram illustrating an alternative embodiment of a method for performing uplink power control in a radio communication system. The method illustrated in FIG. 12 corresponds to the method illustrated in FIG. 11 with the addition of a further step 121. In the step 121 the UE transmits in the uplink at a power level which is based upon accumulated TPC commands. The step 121 is performed once the UE has uplink transmission scheduled in a subframe. If it was decided in the step 113 to accumulate the TPC command received in the step 111, the power level at which the UE transmits in the step 121 will be based on the TPC command received in the step 111 as well as any previously or subsequently accumulated TPC commands which have been taken into account prior to the transmission. If it was decided in the step 113 that the TPC command received in the step 111 was not to be accumulated, the power level at which the UE transmits in the step 121 will not be based on the TPC command received in the step 111. The transmission in the uplink in step 121 involves transmission of uplink data. This uplink data can be any type of data that is transmitted in the uplink, such as user data transmitted on PUSCH as well as control data transmitted on PUCCH and SRS data.

Figure 13:
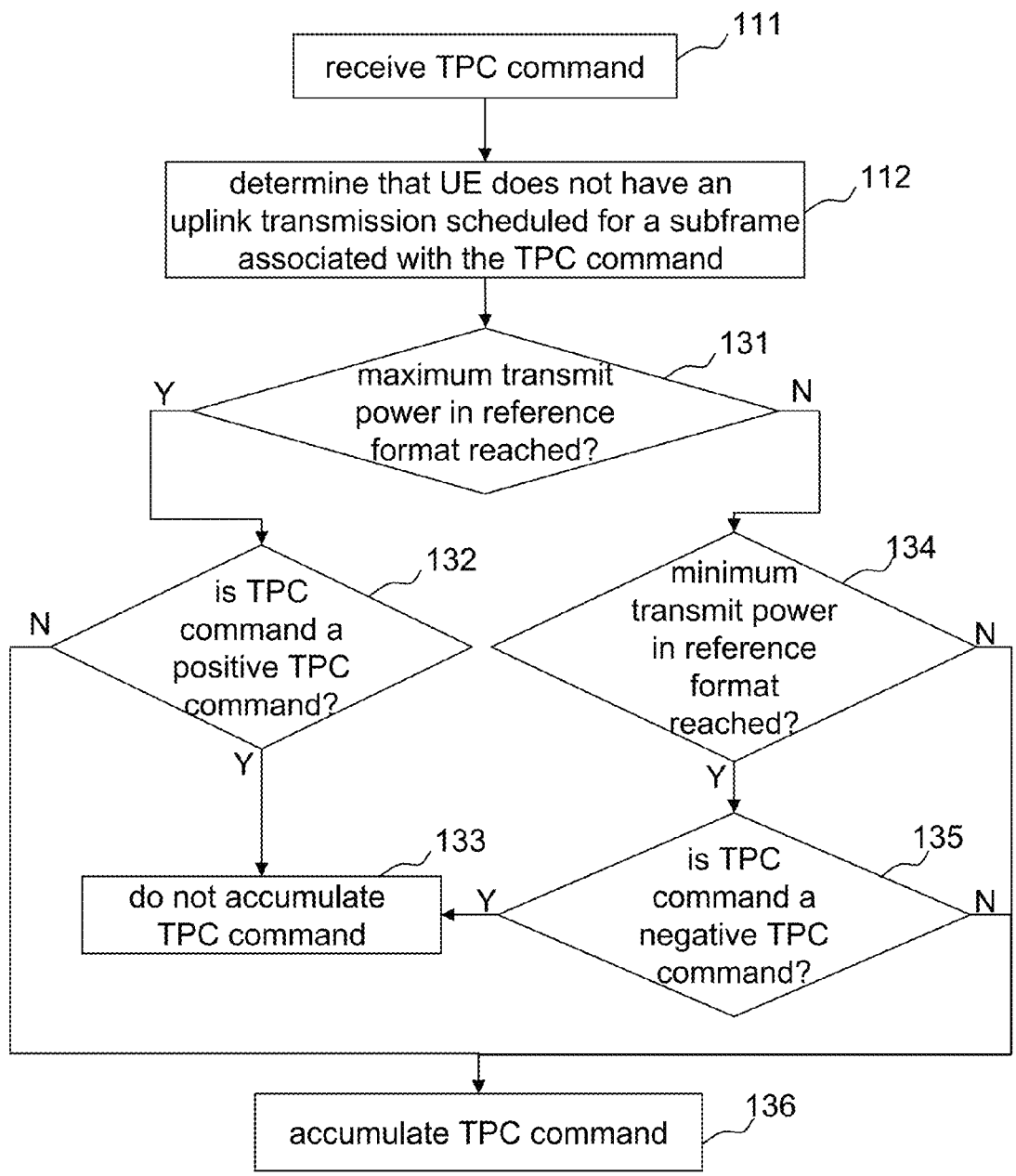
FIG. 13 is a flow diagram illustrating another alternative embodiment of a method for performing uplink power control.

FIG. 13 is a flow diagram illustrating another exemplary embodiment of a method for performing uplink power control in a radio communication system. The method is performed in a UE. Steps 111 and 112 of the method illustrated in FIG. 13 corresponds to the steps 111 and 112 of FIGS. 11 and 12 explained above. In a step 131 it is examined if the UE has reached a maximum transmit power in the reference format which is used according to the first set of embodiments. If the maximum transmit power has been reached it is determined in a step 132 if the TPC command received in the step 111 is a positive TPC command, i.e. a command demanding a raise of the transmit power. If the received TPC command is positive, the TPC command is not accumulated according to a step 133 in order to not breach the maximum transmit power obtained through the reference format. However, if the TPC command is not a positive TPC command, it is accumulated in a step 136. If it is determined in the step 131 that the maximum transmit power has not been reached, it is checked in step 134 if the minimum transmit power derived from the reference format has been reached by the UE. If it is determined through the step 131 and 134 that neither the maximum nor the minimum transmit power has been reached, the TPC command is accumulated in the step 136. On the other hand, if it is determined in the step 134 that the minimum transmit power has been reached, the UE determines in a step 135 if the TPC command received in the step 111 is a negative TPC command, i.e. a command demanding a decrease of the transmit power. If the received TPC command is negative, the TPC command is not accumulated, according to the step 133, in order to not breach the minimum transmit power obtained through the reference format.

There are many different variations of the method illustrated in FIG. 13. In alternative embodiments the order of several of the steps illustrated in FIG. 13 may e.g. be changed. However, it can be understood from the example embodiment illustrated in FIG. 13 that, according to some embodiments, if the UE has reached the maximum transmit power in the reference format, the received TPC command is not accumulated with previously received TPC commands when the TPC command is a positive TPC command. Furthermore, according to some embodiments, if the UE has reached the minimum transmit power in the reference format, the received TPC command is not accumulated with previously received TPC commands when the TPC command is a negative TPC command.

According to some example embodiments the reference format specifies fixed values for Maximum Power Reduction (MPR), Additional Maximum Power Reduction (A-MPR) and Power Management Maximum Power Reduction (P-MPR). A reference format could e.g. specify MPR to 0 dB, A-MPR to 0 dB and P-MPR to 0 dB.

According to some example embodiments, a reference format for a PUSCH transmission is based on fixed parameter value assumptions for $M_{PUSHc}(i)$ and $\Delta_{TFc}(i)$, where $M_{PUSHc}(i)$ is the number of resource blocks assigned for a serving cell c and $\Delta_{TFc}(i)$ is a transport format compensator for the serving cell c.

According to an example embodiment a reference PUSCH format is defined, which contains values for MPR, A-MPR and P-MPR associated with $P_{CMAX,c}$,
$M_{PUSCHc}(i)$ and $\Delta_{TFc}(i)$, e.g.
$M_{PUSCHc}(i)=10$,
$\Delta_{TFc}(i)=0$,
MPR=0 dB,
A-MPR=0 dB and
P-MPR=0 dB.

The reference format parameter values can be fixed values that are defined in a standard or values signaled from the network to the UE. Accordingly, parameter values of the reference format could be pre-configured in the UE or received in the UE via signaling.

Alternatively other parameters are provided in the reference configuration which enables calculation of $M_{PUSCHc}(i)$ and $\Delta_{TFc}(i)$.

By using an appropriate reference format the UE can accumulate TPC commands in an appropriate way. Thus situations where the UE accumulates TPC commands to undesirably high or low transmit power levels can be avoided to a larger extent. Also situations where the UE is not receptive to TPC commands when the UE is not scheduled for uplink transmission can be avoided. Accordingly there are several advantages associated with the first set of embodiments.

However there are also other alternative sets for embodiments which deal with accumulation of TPC commands when the UE does not transmit a PUCCH, SRS or PUSCH transmission.

In a second set of embodiments, the UE always applies the TPC command from a DCI format 3/3A message if the UE does not have any PUSCH, PUCCH or SRS transmission. That is, the UE assumes that it has not reached $P_{CMAX,c}$, or the UE's minimum transmission power. Accordingly, in this set of embodiments, the UE applies (accumulates) a received TPC command even though the UE does not have a corresponding UL transmission on one (or more) channels. Some non-exhaustive example sub-embodiments of this set of embodiments include the following:

In a first sub-embodiment the UE always applies the TPC command from a DCI format 3/3A message if the UE does not have any PUSCH transmission.

In a second sub-embodiment the UE always applies the TPC command from a DCI format 3/3A message if the UE does not have any PUCCH transmission.

In a third sub-embodiment the UE always applies the TPC command from a DCI format 3/3A message if the UE does not have any SRS transmission.

In a fourth sub-embodiment the UE always applies the TPC command from a DCI format 3/3A message if the UE does not have any PUSCH transmission and the resulting accumulated power control value is more than the UE's pathloss estimate.

In a fifth sub-embodiment the UE always applies the TPC command from a DCI format 3/3A message if the UE does not have any PUCCH transmission and the resulting accumulated power control value is more than the UE's pathloss estimate.

In a sixth sub-embodiment the UE always applies the TPC command from a DCI format 3/3A message if the UE does not have any SRS transmission and the resulting accumulated power control value is more than the UE's pathloss estimate.

In a seventh sub-embodiment the UE always applies the TPC command from a DCI format 3/3A message if the UE does not have any PUCCH transmission and the resulting accumulated power control value is equal to or less than −40 dBm, cf. section 6.3.2 of the standard specification 3GPP TS. 36.101 V10.3.0 (2011-06).

In an eighth sub-embodiment the UE always applies the TPC command from a DCI format 3/3A message if the UE does not have any PUSCH transmission and the resulting accumulated power control value is equal to or less than −40 dBm, cf. section 6.3.2 of the standard specification 3GPP TS. 36.101 V10.3.0 (2011-06).

In a ninth sub-embodiment the UE always applies the TPC command from a DCI format 3/3A message if the UE does not have any SRS transmission and the resulting accumulated power control value is equal to or less than −40 dBm, cf. section 6.3.2 of the standard specification 3GPP TS. 36.101 V10.3.0 (2011-06).

Accordingly, an example method for performing uplink power control in a radio communication system according to the second set of embodiments comprises the steps of: receiving, at a user equipment (UE), a transmit power control (TPC) command; determining, by the UE, that the UE does not have an uplink transmission scheduled for a subframe associated with said TPC command; and accumulating, by the UE, said TPC command with previously received TPC commands.

In a third set of embodiments, the UE determines whether to accumulate a received TPC command by checking if the UE has reached $P_{CMAX,c}$ or if the UE has derived a transmission power that is below the minimum transmit power in the last (or the following) transmitted PUSCH/SRS or PUCCH transmission. Accordingly, in this set of embodiments, the UE makes decisions about whether to apply or accumulate a received TPC command based on transmit powers associated with a previous or a subsequent UL transmission. Some non-exhaustive examples of this set of embodiments include the following:

In an example embodiment the UE determines whether to accumulate a received TPC command by checking whether it has reached $P_{CMAX,c}$ or if the UE's derived transmission power is below the minimum transmit power in the last PUSCH transmission or the following PUSCH transmission. If the UE has not reached $P_{CMAX,c}$ and is above the minimum transmit power the UE will accumulate the TPC command. If the UE has reached $P_{CMAX,c}$ or derived transmission power that is below the minimum transmit power the UE will not accumulate the TPC command.

In another embodiment the UE determines whether to accumulate a received TPC command by checking whether it has reached $P_{CMAX,c}$ or if the UEs derived transmission power is below the minimum transmit power in the last or the following SRS transmission. If the UE has not reached $P_{CMAX,c}$ and is above the minimum transmit power the UE will accumulate the TPC command. If the UE has reached $P_{CMAX,c}$ or derived transmission power that is below the minimum transmit power, the UE will not accumulate the TPC command.

In a further embodiment the UE determines whether to accumulate a received TPC command by checking whether it has reached $P_{CMAX,c}$ or the UEs derived transmission power is below the minimum transmit power in the last or the following PUCCH transmission. If the UE has not reached $P_{CMAX,c}$ and its transmit power is above the minimum transmit power the UE will accumulate the TPC command. If the UE has reached $P_{CMAX,c}$ or the derived transmission power is below the minimum transmit power the UE will not accumulate the TPC command.

Accordingly, a method for performing uplink power control in a radio communication system according to the third set of embodiments comprises the steps of: receiving, at a user equipment (UE), a transmit power control (TPC) command; determining, by the UE, that the UE does not have an uplink transmission scheduled for a subframe associated with said TPC command; and accumulating, by the UE, said TPC command with previously received TPC commands based on whether the UE has reached a maximum transmit power or a minimum transmit power for either a previous or subsequent subframe.

In a fourth set of embodiments, the UE discards all TPC commands that are not applied in a subframe where the UE has a corresponding UL transmission on with at least one of the following channels/signals: PUSCH, PUCCH or SRS. In this set of embodiments the UE discards all TPC commands that are not applied in a subframe where the UE has a corresponding UL transmission on PUSCH, PUCCH or SRS. Thus a method for performing uplink power control in a radio communication system according to the fourth set of embodiments comprises the steps of: receiving, at a user equipment (UE), a transmit power control (TPC) command; determining, by the UE, that the UE does not have an uplink transmission scheduled for a subframe associated with said TPC command; and discarding, by the UE, said TPC command.

For each of the four previous sets of embodiments, the described example methods for performing uplink power control in a radio communication system can continue with the step of transmitting, by the UE, in the uplink at a power level which is based upon accumulated TPC commands.

Moreover, for each of the four previous sets of embodiments, the described example methods can be further refined by adding details of any one of the corresponding sub-embodiments described herein thus generating a number of methods which correspond to the number of sub-embodiments described herein.

Figure 10:
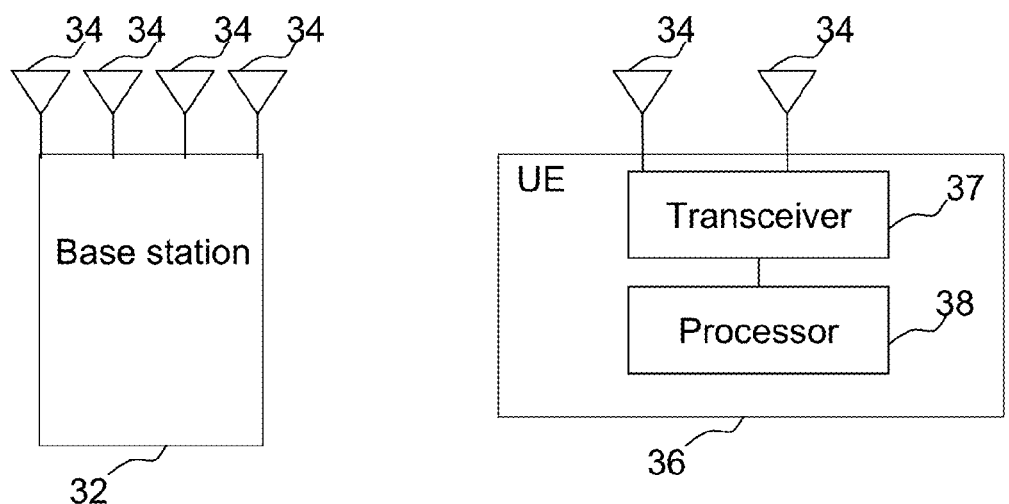
FIG. 10 is a schematic diagram illustrating a base station and a user equipment.

FIG. 10 is a schematic block diagram illustrating a radio communication system in which the above described example embodiments may be used. FIG. 10 shows a base station 32 having four antennas 34 and a UE 36 having two antennas 34. The number of antennas shown in FIG. 10 is an example only, and is not intended to limit the actual number of antennas used at the base station 32 or at the UE 36 in the example embodiments described herein. Modern wireless communication systems often include transceivers that use multi-antennas to increase the transmission rate of the systems, and to provide additional diversity against fading on the radio channels. Multi-antenna systems may e.g. make use of Multiple Input Multiple Output (MIMO) techniques or transmit/receive diversity techniques such as beamforming and antenna switching. The multi-antennas may thus be distributed to the receiver side, to the transmitter side and/or provided at both sides as shown in FIG. 10. FIG. 10 illustrates that the UE 36 comprises a transceiver 38 and a processor 38. The UE 36 may be configured to implement any of the above described example sets of embodiments and sub-embodiments or any of the example methods illustrated in FIG. 11, 12 or 13.

For example, according to an embodiment, the transceiver 37 is configured to receive a TPC command. Furthermore the processor 38 is configured to determine that the UE 36 does not have an uplink transmission scheduled for a subframe associated with the TPC command and further configured to accumulate the TPC command with previously received TPC commands.

According to another embodiment, the transceiver 37 is configured to receive a TPC command. Furthermore the processor 38 is configured to determine that the UE 36 does not have an uplink transmission scheduled for a subframe associated with the TPC command and further configured to accumulate the TPC command with previously received TPC commands based on whether the UE has reached a maximum transmit power or a minimum transmit power for either a previous or subsequent subframe.

According to another embodiment, the transceiver 37 is configured to receive a TPC command. Furthermore the processor 38 is configured to determine that the UE 36 does not have an uplink transmission scheduled for a subframe associated with the TPC command and further configured to accumulate the TPC command with previously received TPC commands based on whether the UE has reached a maximum transmit power or a minimum transmit power in a reference format for a PUSCH/SRS or PUCCH transmission.

According to another embodiment, the transceiver 37 is configured to receive a TPC command. Furthermore the processor 38 is configured to determine that the UE 36 does not have an uplink transmission scheduled for a subframe associated with the TPC command and further configured to discard the TPC command.

For each of the four previous example embodiments, the transceiver 37 may further be configured to transmit uplink data at a power level which is based upon accumulated TPC commands. Moreover, each of the example embodiments of the UE 36 can be further refined by adding details of any one of the corresponding sub-embodiments described above, thus generating a number of devices which correspond to the number of sub-embodiments described above. Still further, in any of the embodiments described, receipt of the TPC command can be implemented via receipt of a DCI format 3/3A message. The transceiver 37 and processor 38 may comprise, or be configured to execute, software that causes the transceiver 37 and processor 38 to carry out the example method embodiments described above.

A general background and introduction to the problem addressed by the embodiments of this disclosure was provided above. More details regarding PUCCH and data processing in an LTE architecture will be provided below to give a deeper understanding of some aspects related to LTE systems.

Figure 5:
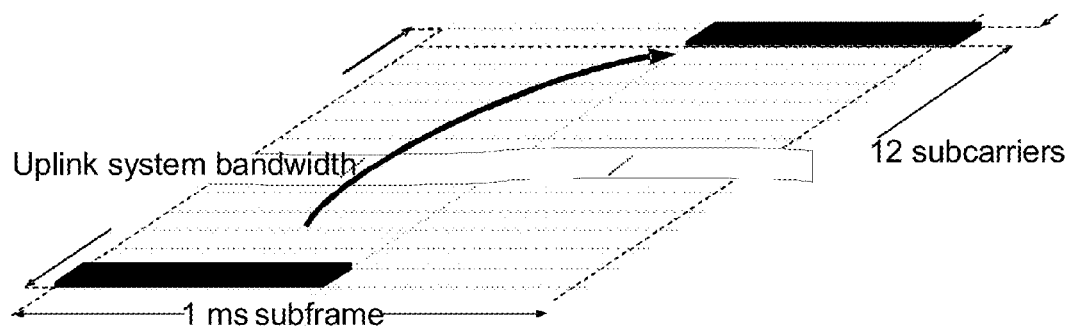
FIG. 5 is a schematic diagram illustrating uplink L1/L2 control signalling transmission on PUCCH.

As mentioned above, if a UE has not been assigned an uplink resource for data transmission, L1/L2 control information is transmitted in specifically assigned uplink resources on the PUCCH. As illustrated in FIG. 5, these resources are located at the edges of the total available cell bandwidth. Each such resource consists of twelve "subcarriers" (one resource block) within each of the two slots of an uplink subframe. In order to provide frequency diversity, these frequency resources are frequency hopping on the slot boundary, i.e. one "resource" consists of 12 subcarriers at the upper part of the spectrum within the first slot of a subframe and an equally sized resource at the lower part of the spectrum during the second slot of the subframe or vice versa. If more resources are needed for the uplink L1/L2 control signaling, e.g. in case of very large overall transmission bandwidth supporting a large number of users, additional resources blocks can be assigned next to the previously assigned resource blocks.

The reasons for locating the PUCCH resources at the edges of the overall available spectrum are two-fold:

Together with the frequency hopping described above, this maximizes the frequency diversity experienced by the control signaling Assigning uplink resources for the PUCCH at other positions within the spectrum, i.e. not at the edges, would have fragmented the uplink spectrum, making it impossible to assign very wide transmission bandwidths to a single mobile terminal and still retain the single-carrier property of the uplink transmission The bandwidth of one resource block during one subframe is too large for the control signaling needs of a single terminal. Therefore, to efficiently exploit the resources set aside for control signaling, multiple terminals can share the same resource block. This is done by assigning the different terminals different orthogonal phase rotations of a cell-specific length-12 frequency-domain sequence. A linear phase rotation in the frequency domain is equivalent to applying a cyclic shift in the time domain. Thus, although the term "phase rotation" is used herein, the term cyclic shift is sometimes used with an implicit reference to the time domain.

The resource used by a PUCCH is therefore not only specified in the time-frequency domain by the resource-block pair, but also by the phase rotation applied. Similarly to the case of reference signals, there are up to twelve different phase rotations specified, providing up to twelve different orthogonal sequences from each cell-specific sequence. However, in the case of frequency-selective channels, not all the twelve phase rotations can be used if orthogonality is to be retained. Typically, up to six rotations are considered usable in a cell.

As mentioned above, uplink L1/L2 control signaling include hybrid-ARQ acknowledgements, channel-status reports and scheduling requests. Different combinations of these types of messages are possible as described further below, but to explain the structure for these cases it is beneficial to discuss separate transmission of each of the types first, starting with the hybrid-ARQ and the scheduling request. There are two formats defined for PUCCH, each capable of carrying a different number of bits.

Regarding the first format defined for PUCCH, i.e., PUCCH format 1, Hybrid-ARQ acknowledgements are used to acknowledge the reception of one (or two in case of spatial multiplexing) transport blocks in the downlink. Scheduling requests are used to request resources for uplink data transmission. Obviously, a scheduling request should only be transmitted when the terminal is requesting resources, otherwise the terminal should be silent in order to save battery resources and not create unnecessary interference. Hence, unlike hybrid-ARQ acknowledgements, no explicit information bit is transmitted by the scheduling request; the information is instead conveyed by the presence (or absence) of energy on the corresponding PUCCH. However, the scheduling request, although used for a completely different purpose, share the same PUCCH format as the hybrid-ARQ acknowledgement. This format is referred to as PUCCH format 1 in the 3GPP specifications.

Figure 6:
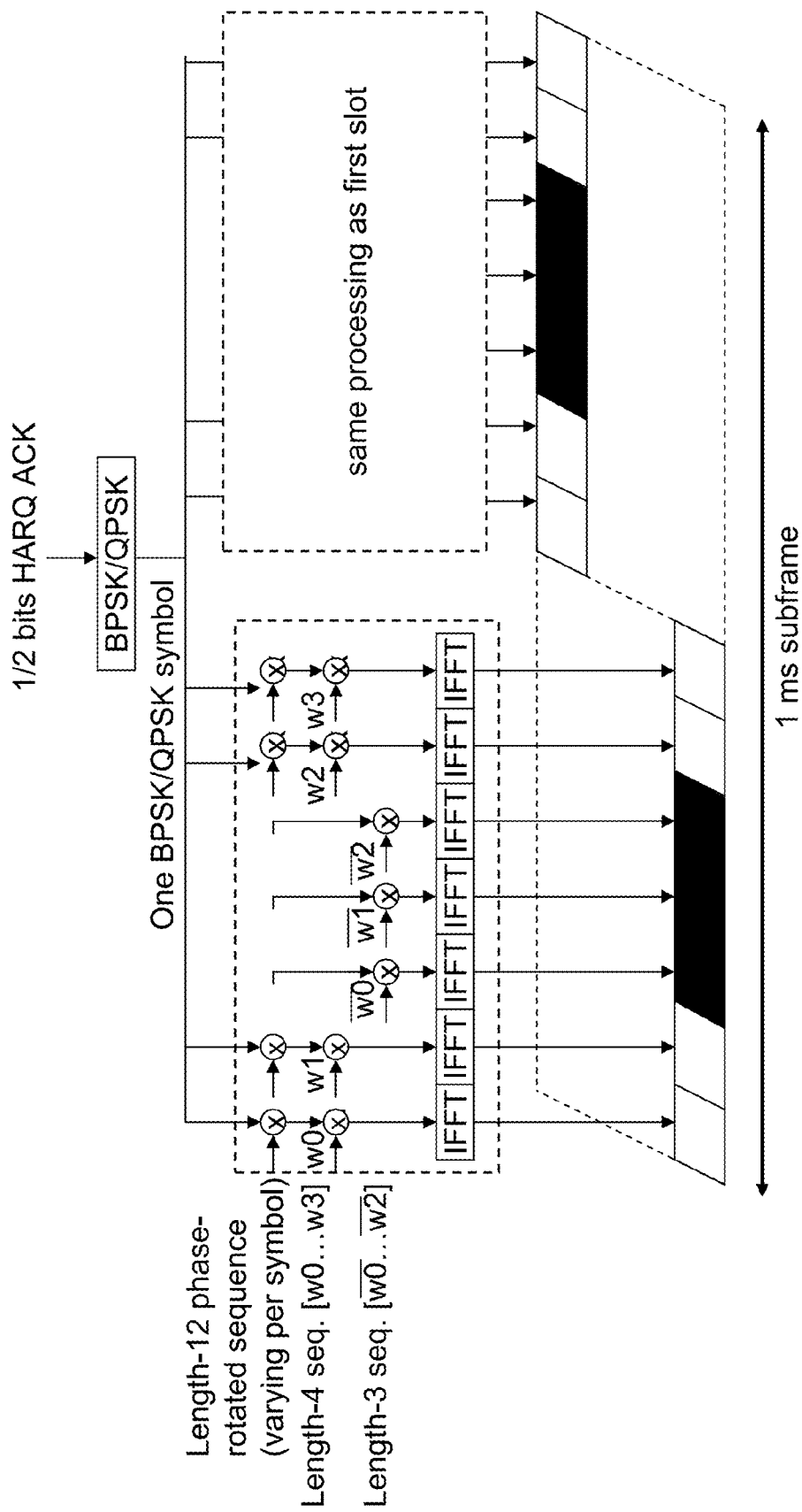
FIG. 6 is a schematic diagram illustrating PUCCH format 1 with normal cyclic prefix.

PUCCH format 1 uses the same structure in the two slots of a subframe as illustrated in FIG. 6. For transmission of a hybrid-ARQ acknowledgement, the single hybrid-ARQ acknowledgement bit is used to generate a BPSK symbol (in case of downlink spatial multiplexing the two acknowledgement bits are used to generate a QPSK symbol). For a scheduling request, on the other hand, the BPSK/QPSK symbol is replaced by a constellation point treated as negative acknowledgement at the eNodeB. The modulation symbol is then used to generate the signal to be transmitted in each of the two PUCCH slots.

A PUCCH format 1 resource, used for either a hybrid-ARQ acknowledgement or a scheduling request, is represented by a single scalar resource index. From the index, the phase rotation and the orthogonal cover sequences is derived.

As mentioned above, a PUCCH resource can be represented by an index. For hybrid-ARQ transmission, the resource index to use for transmission of the hybrid-ARQ acknowledgement is given implicitly by the downlink control signaling used to schedule the downlink transmission to the terminal. Thus, the resources to use for an uplink hybrid-ARQ acknowledgement vary dynamically and depend on the downlink control channel used to schedule the terminal in each subframe.

In addition to dynamic scheduling by using the Packet Downlink Control Channel (PDCCH), there is also the possibility to semi-persistently schedule a terminal according to a specific pattern. In this case the configuration of the semi-persistent scheduling pattern includes information on the PUCCH index to use for the hybrid-ARQ acknowledgement. This is also true for scheduling requests, where configuration information informs the terminal which PUCCH resources to use for transmission of scheduling requests.

Thus, to summarize, PUCCH format 1 resources are split into two parts:

Semi-static part, used for scheduling requests and hybrid-ARQ acknowledgements from semi-persistently users. The amount of resources used for the semi-static part of PUCCH 1 resources does not vary dynamically.

Dynamic part, used for dynamically scheduled terminals. As the number of dynamically scheduled terminals varies, the amount of resources used for the dynamic PUCCHs varies.

Turning now to the second format, i.e., PUCCH format 2, channel-status reports are used to provide the eNodeB with an estimate of the channel properties at the terminal in order to aid channel-dependent scheduling. A channel-status report consists of multiple bits per subframe. PUCCH format 1, which is capable of at most two bits of information per subframe, can obviously not be used for this purpose. Transmission of channel-status reports on the PUCCH is instead handled by PUCCH format 2, which is capable of multiple information bits per subframe. There are actually three variants in the LTE specifications, formats 2, 2a and 2b, where the last two formats are used for simultaneous transmission of hybrid-ARQ acknowledgements as discussed later in this section. However, for simplicity, they are all referred to as format 2 herein.

Figure 7:
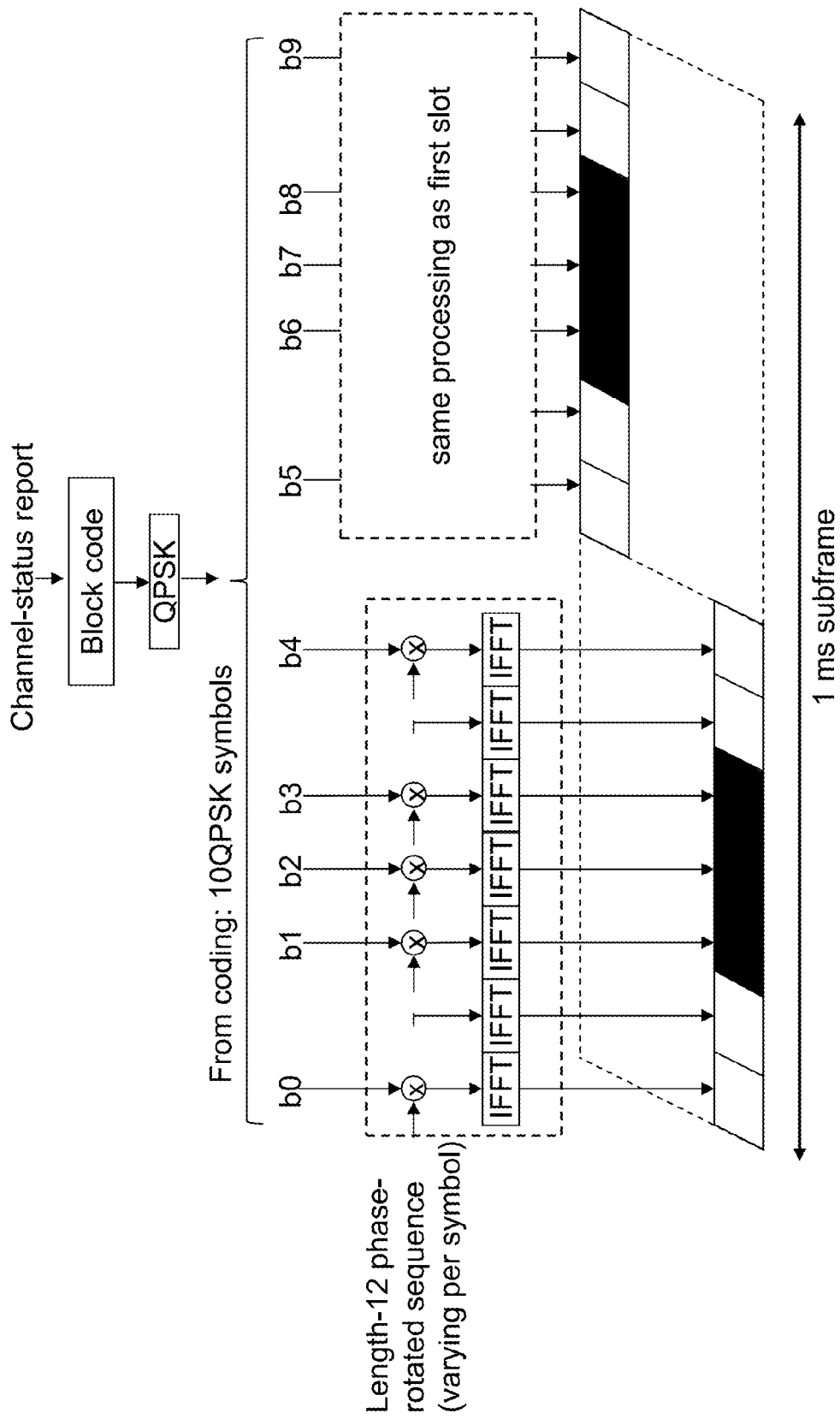
FIG. 7 is a schematic diagram showing PUCCH format 2 with normal cyclic prefix.

PUCCH format 2, illustrated for normal cyclic prefix in FIG. 7, is based on a phase rotation of the same cell-specific sequence as format 1. Similarly to format 1, a format 2 resource can be represented by an index from which the phase rotation and other quantities necessary are derived. The PUCCH format 2 resources are semi-statically configured.

The signals described above, for both of the PUCCH formats, are, as already explained, transmitted on a resource-block pair with one resource block in each slot. The resource-block pair to use is determined from the PUCCH resource index. Thus, the resource-block number to use in the first and second slot of a subframe can be expressed as:

$$RB\text{number}(i) = f(\text{PUCCH index}, i)$$

where i is the slot number (0 or 1) within the subframe and f a function found in the 3GPP specification.

Multiple resource-block pairs can be used to increase the control-signaling capacity; when one resource-block pair is full the next PUCCH resource index is mapped to the next resource-block pair in sequence. The mapping is in principle done such that PUCCH format 2 (channel-status reports) is transmitted closest to the edges of the uplink cell bandwidth with the semi-static part of PUCCH format 1 next and finally the dynamic part of PUCCH format 1 in the innermost part of the bandwidth.

Three semi-static parameters are used to determine the resources to use for the different PUCCH formats:

$N_{RB}^{(2)}$, provided as part of the system information, controls on which resource-block pair the mapping of PUCCH format 1 starts $N_{PUCCH}^{(1)}$ controls the split between the semi-static and dynamic part of PUCCH format 1

X controls the mix of format 1 and format 2 in one resource block. In most cases, the configuration is done such that the two PUCCH formats are mapped to separate sets of resource blocks, but there is also a possibility to have the border between format 1 and 2 within a resource block.

Figure 8:
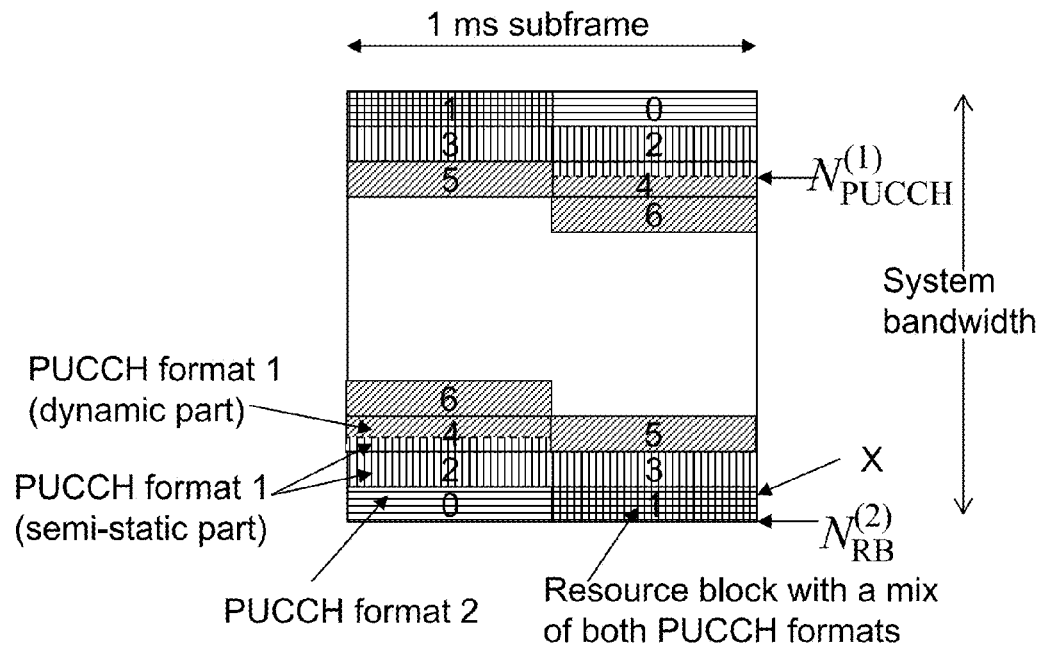
FIG. 8 is a schematic diagram illustrating allocation of resource blocks for PUCCH.

The PUCCH resource allocation in terms of resource blocks are illustrated in FIG. 8. The numbers 0, 1, 2, . . . within the illustrated resource blocks represent the order in which the resource blocks are allocated to PUCCH, i.e., a large PUCCH configuration may need resource 0-6 while a small configuration may use only 0.

Figure 14:
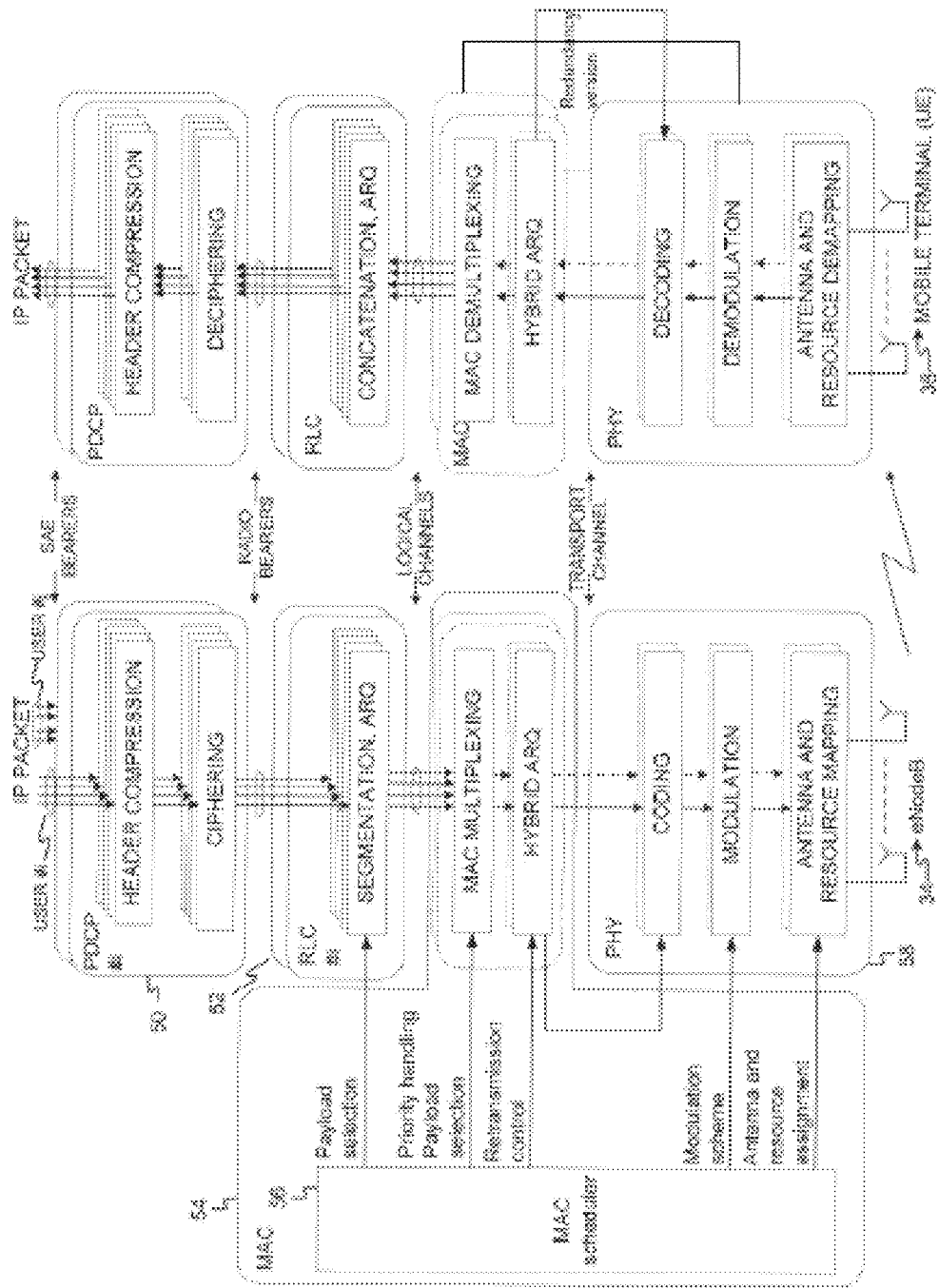
FIG. 14 is a schematic diagram illustrating processing of data packets in LTE.

Now some more detailed information about processing of data for transmission in an LTE system will be provided which may be useful for a deeper understanding of some of the embodiments described above. One example LTE architecture for processing data for transmission by an eNodeB 32 to a UE 36 (downlink) is shown in FIG. 14. Therein, data to be transmitted by the eNodeB 32 (e.g., IP packets) to a particular user is first processed by a packet data convergence protocol (PDCP) entity 50 in which the IP headers are (optionally) compressed and ciphering of the data is performed. A radio link control (RLC) entity 52 handles, among other things, segmentation of (and/or concatenation of) the data received from the PDCP entity 50 into protocol data units (PDUs). Additionally, the RLC entity 52 provides a retransmission protocol (ARQ) which monitors sequence number status reports from its counterpart RLC entity in the UE 36 to selectively retransmit PDUs as requested. A medium access control (MAC) entity 54 is responsible for uplink and downlink scheduling via scheduler 56, as well as the hybrid-ARQ processes discussed above. A physical (PHY) layer entity 58 takes care of coding, modulation, and multi-antenna mapping, among other things. Each entity shown in FIG. 11 provides outputs to, and receives inputs from, their adjacent entities by way of bearers or channels as shown. The reverse of these processes are provided for the UE 36 as shown in FIG. 14 for the received data, and the UE 36 also has similar transmit chain elements as the eNB 34 for transmitting on the uplink toward the eNB 32.

Figure 15:
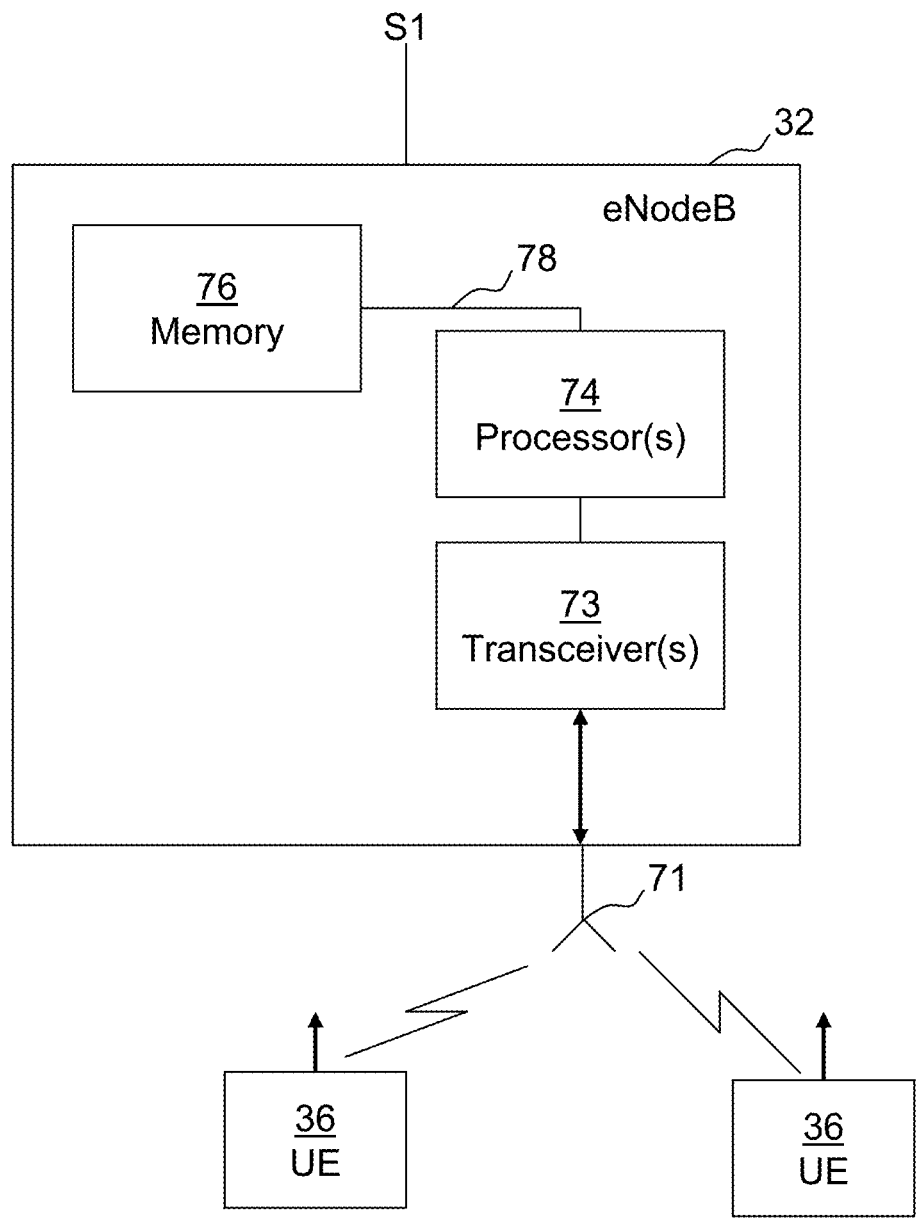
FIG. 15 is a schematic block diagram of an eNodeB.

An example base station 32, e.g., an eNodeB, which is configured to interact with the UE 36 as described above is generically illustrated in FIG. 15. Therein, the eNodeB 32 includes one or more antennas 71 connected to processor(s) 74 via transceiver(s) 73. The processor 74 is configured to analyze and process signals received over an air interface via the antennas 71, as well as those signals received from core network node (e.g., access gateway) via, e.g., an interface. The processor(s) 74 may also be connected to one or more memory device(s) 76 via a bus 78. Further units or functions, not shown, for performing various operations as encoding, decoding, modulation, demodulation, encryption, scrambling, precoding, etc. may optionally be implemented not only as electrical components but also in software or a combination of these two possibilities to enable the transceiver(s) 73 and processor(s) 74 to process uplink and downlink signals. A similar, generic structure, e.g., including a memory device, processor(s) and a transceiver or as illustrated in FIG. 10, can be used (among other things) to implement communication nodes such as UEs 36 to receive TPC commands and process those commands in the manner described above, e.g., when the UE is not transmitting on an uplink channel.

From the description above it is apparent that, among other advantages, examplary embodiments enable a UE to receive TPC commands while the UE is not transmitting anything in the UL. This gives, for example, the UE more opportunity to receive TPC commands and therefore allows the eNB to communicate with the UE under conditions where the required transmit energy from the UE varies significantly.

The above-described example embodiments are intended to be illustrative in all respects, rather than restrictive. All such variations and modifications are considered to be within the scope of protection as defined by the following claims. No element, act, or instruction used in the description of the present application should be construed as critical or essential to the invention unless explicitly described as such. Also, as used herein, the article "a" is intended to include one or more items.

ABBREVIATIONS

ACK Acknowledgement
ARQ Automatic Repeat Request
DCI Downlink Control Information
DL Downlink
HARQ Hybrid Automatic Repeat Request
LTE Long term evolution
MAC Medium Access Control
MIMO Multiple-Input Multiple-Output
NACK Non Acknowledgement
OFDM Orthogonal Frequency Division Multiple Access
PDCCH Physical Downlink Control Channel
PDU Protocol Data Unit
PUCCH Physical Uplink Control Channel
PUSCH Physical Uplink Shared Channel
RLC Radio Link Control
RNTI Radio Network Temporary Identity
SRS Sounding Reference Signal
TPC Transmit Power Control
UE User equipment
UL Uplink

The invention claimed is:

1. A method performed by a user equipment, UE, for uplink power control in a radio communication system, the method comprising:
   receiving a transmit power control, TPC, command; and
   if the UE does not have an uplink transmission scheduled on any of a Physical Uplink Shared Channel, PUSCH, Sounding Reference Signal, SRS, and Physical Uplink Control Channel, PUCCH for a subframe associated with said TPC command, accumulating, said TPC command with previously received TPC commands based on whether the UE has reached a maximum transmit power or a minimum transmit power in a reference format for a PUSCH, SRS or PUCCH transmission,
   wherein the accumulating includes adding a value of said TPC command to values of said previously received TPC commands.

2. The method according to claim 1, further comprising;
   transmitting, by the UE, in the uplink at a power level which is based upon accumulated TPC commands.

3. The method according to claim 1, wherein, if the UE has reached said maximum transmit power in the reference format, said TPC command is not accumulated with previously received TPC commands when the TPC command is a positive TPC command.

4. The method according to claim 1, wherein, if the UE has reached said minimum transmit power in the reference format, said TPC command is not accumulated with previously received TPC commands when the TPC command is a negative TPC command.

5. The method according to claim 1, wherein said TPC command is received in a Downlink Control Information, DCI, format 3/3A message.

6. The method according to claim 1, wherein the reference format specifies fixed values for Maximum Power Reduction, MPR, Additional Maximum Power Reduction, A-MPR, and Power Management Maximum Power Reduction, P-MPR.

7. The method according to claim 6, wherein the reference format specifies MPR to 0 dB, A-MPR to 0 dB and P-MPR to 0 dB.

8. The method according to claim 1, wherein the reference format for a PUSCH transmission is based on fixed parameter value assumptions for $M_{PUSHc}(i)$ and $\Delta_{TFc}(i)$, wherein $M_{PUSHc}(i)$ is the number of resource blocks assigned for a serving cell c and $\Delta_{TFc}(i)$ is a transport format compensator for the serving cell c.

9. The method according to claim 1, wherein parameter values of said reference format are pre-configured in the UE.

10. The method according to claim 1, wherein parameter values of said reference format are received in the UE via signaling.

11. A user equipment, UE, configured for use in a radio communication system, the UE comprising;
    a transceiver configured to receive a transmit power control, TPC command, and
    a processor, configured, if the UE does not have an uplink transmission scheduled on any of a Physical Uplink Shared Channel, PUSCH, Sounding Reference Signal, SRS, and Physical Uplink Control Channel, PUCCH, for a subframe associated with said TPC command, to accumulate said TPC command with previously received TPC commands based on whether the UE has reached a maximum transmit power or a minimum transmit power in a reference format for a PUSCH, SRS or PUCCH transmission wherein the processor accumulates said TPC command by adding a value of the TPC command to values of the previously received TPC commands.

12. The UE according to claim 11, wherein the transceiver is further configured to transmit in an uplink at a power level which is based upon accumulated TPC commands.

13. The UE according to claim 11, wherein the processor is configured to, if the UE has reached said maximum transmit power in the reference format, not accumulate said TPC command with previously received TPC commands when the TPC command is a positive TPC command.

14. The UE according to claim 11, wherein, the processor is configured to, if the UE has reached said minimum transmit power in the reference format, not accumulate said TPC command with previously received TPC commands when the TPC command is a negative TPC command.

15. The UE according to claim 11, wherein the transceiver is configured to receive said TPC command in a Downlink Control Information, DCI, format 3/3A message.

16. The UE according to claim 11, wherein the reference format specifies fixed values for Maximum Power Reduction, MPR, Additional Maximum Power Reduction, A-MPR, and Power Management Maximum Power Reduction, P-MPR.

17. The UE according to claim 16, wherein the reference format specifies MPR to 0 dB, A-MPR to 0 dB and P-MPR to 0 dB.

18. The UE according to claim 11, wherein the reference format for a PUSCH transmission is based on fixed parameter value assumptions for $M_{PUSHc}(i)$ and $\Delta_{TFc}(i)$, wherein $M_{PUSHc}(i)$ is the number of resource block assigned for a serving cell c and $\Delta_{TFc}(i)$ is a transport format compensator for the serving cell c.

19. The UE according to claim 11, wherein the UE is pre-configured with parameter values of said reference format.

20. The UE according to claim 11, wherein the transceiver is configured to receive parameter values of said reference format via signaling.

\* \* \* \* \*

UNITED STATES PATENT AND TRADEMARK OFFICE
CERTIFICATE OF CORRECTION

| | | |
|---|---|---|
| PATENT NO. | : 8,934,403 B2 | Page 1 of 1 |
| APPLICATION NO. | : 13/394932 | |
| DATED | : January 13, 2015 | |
| INVENTOR(S) | : Larsson et al. | |

It is certified that error appears in the above-identified patent and that said Letters Patent is hereby corrected as shown below:

In the Specification

In Column 6, Line 11, delete "hybrid-ARO" and insert -- hybrid-ARQ --, therefor.

In Column 6, Line 37, delete "$P_{CMAX}$," and insert -- $P_{CMAX,c}$ --, therefor.

In Column 8, Line 28, delete "$M_{PUSHc}$" and insert -- $M_{PUSCHc}$ --, therefor.

In Column 8, Line 28, delete "where $M_{PUSHc}$" and insert -- where $M_{PUSCHc}$ --, therefor.

In the Claims

In Column 16, Line 10, in Claim 1, delete "accumulating," and insert -- accumulating --, therefor.

In Column 16, Line 45, in Claim 8, delete "for $M_{PUSHc}$" and insert -- for $M_{PUSCHc}$ --, therefor.

In Column 16, Line 46, in Claim 8, delete "$M_{PUSHc}$" and insert -- $M_{PUSCHc}$ --, therefor.

In Column 16, Line 58, in Claim 11, delete "processor," and insert -- processor --, therefor.

In Column 16, Line 67, in Claim 11, delete "transmission" and insert -- transmission, --, therefor.

In Column 18, Line 9, in Claim 18, delete "$M_{PUSHc}$" and insert -- $M_{PUSCHc}$ --, therefor.

In Column 18, Lines 9-10, in Claim 18, delete "wherein $M_{PUSHc}$" and insert -- wherein $M_{PUSCHc}$ --, therefor.

Signed and Sealed this
Fifth Day of January, 2016

Michelle K. Lee
*Director of the United States Patent and Trademark Office*